April 17, 1934. H. M. JEROME Re. 19,138
BOILER CONSTRUCTION
Original Filed Sept. 19, 1927 2 Sheets-Sheet 1
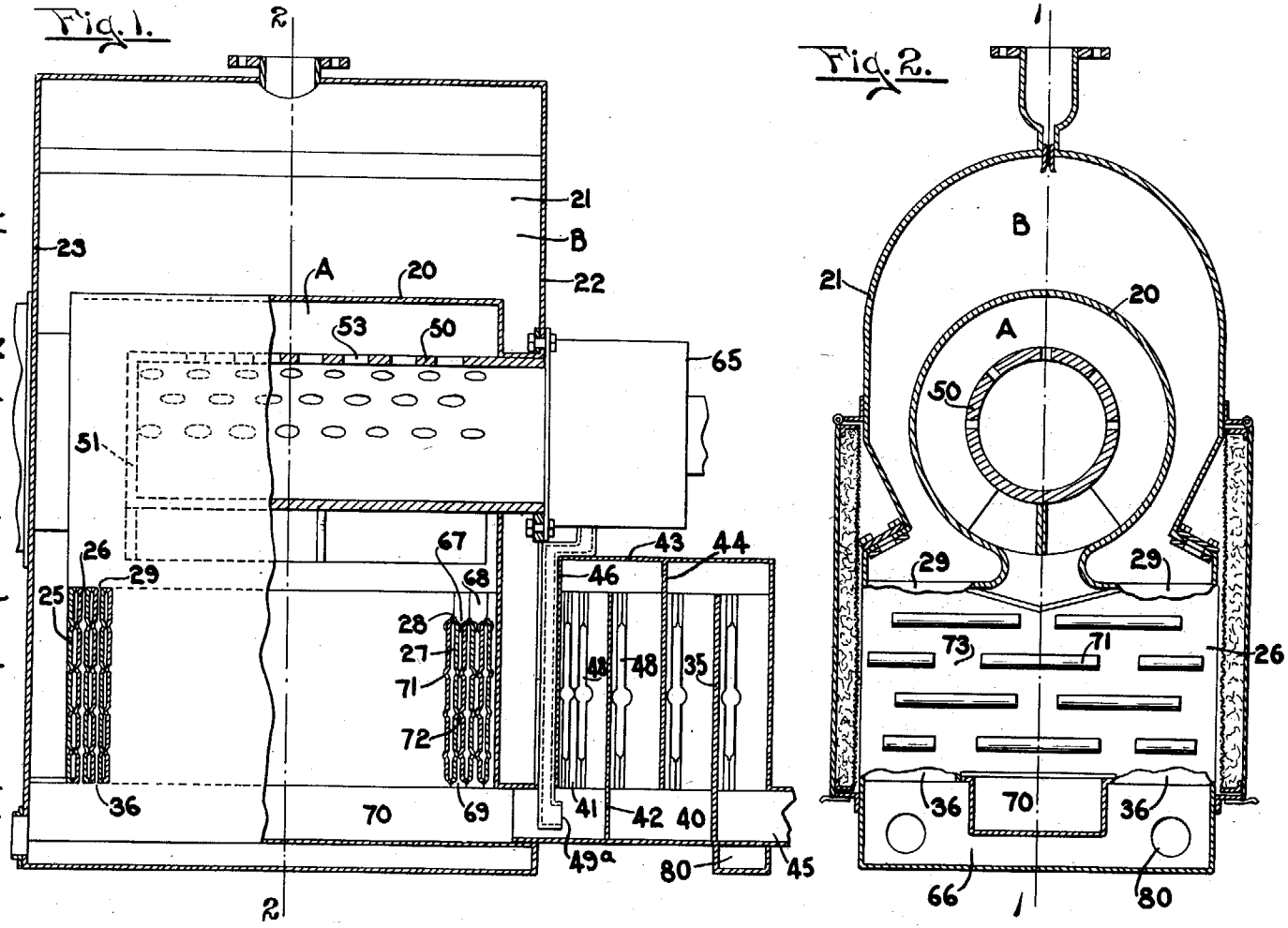
Horace M. Jerome, inventor deceased, by
Wood Hydraulic Hoist & Body Company, assignee
By Livingston & Van Antwerp
Attorneys April 17, 1934. H. M. JEROME Re. 19,138

BOILER CONSTRUCTION

Original Filed Sept 19, 1927 2 Sheets-Sheet 2

Horace M. Jerome, inventor deceased, by Wood Hydraulic Hoist & Body Company, assignee By Lawrance & Van Antwerp Attorneys Reissued Apr. 17, 1934 Re. 19,138

UNITED STATES PATENT OFFICE 19,138

BOILER CONSTRUCTION

Horace M. Jerome, deceased, late of Ann Arbor, Mich., by Garfield A. Wood, assignee, Detroit, Mich., assignor, by mesne assignments, to Wood Hydraulic Hoist & Body Company, a corporation of Michigan Original No. 1,804,777, dated May 12, 1931, Serial No. 220,572, September 19, 1927. Application for reissue May 4, 1933, Serial No. 669,377

15 Claims. (Cl. 122—115)

The invention relates to heat transference machines and more particularly to heat machines of the boiler type which are adapted to efficiently convert the heat of the fuel into heated steam.

The object of the invention is to provide an improved type of construction having a high thermal efficiency, and one which may be readily manufactured at low production costs. In accordance with the invention there has been provided an apparatus more specifically described hereinafter, this apparatus embodying the following features which together result in the attainment of high efficiency.

One of the features of construction is the arrangement wherein the combustion chamber is entirely surrounded by the liquid which it is designed to heat.

Another feature is the arrangement whereby the hottest gases from the combustion chamber are led into intimate contact with the medium to be heated at the point where this medium is to be raised to its hottest or final temperature, while the products of combustion from which heat has already been partly extracted are led into contact with the liquid medium where the latter is at a lower temperature.

A further feature of the construction is the provision of a recuperator or air preheater in which the heat remaining in the combustion gases after they have left the medium to be heated, is still further reduced by causing a heat transference between the products of combustion and the incoming air for the combustion chamber.

Other features of construction will be more apparent after considering the detailed description of one embodiment of the invention which is illustrated in the accompanying drawings.

Figure 1 is a sectional elevation of a boiler taken on the section lines 1—1 of Figures 2 and 7.

Figure 2 is a transverse section on the line 2—2 of Figure 1.

Figure 3:
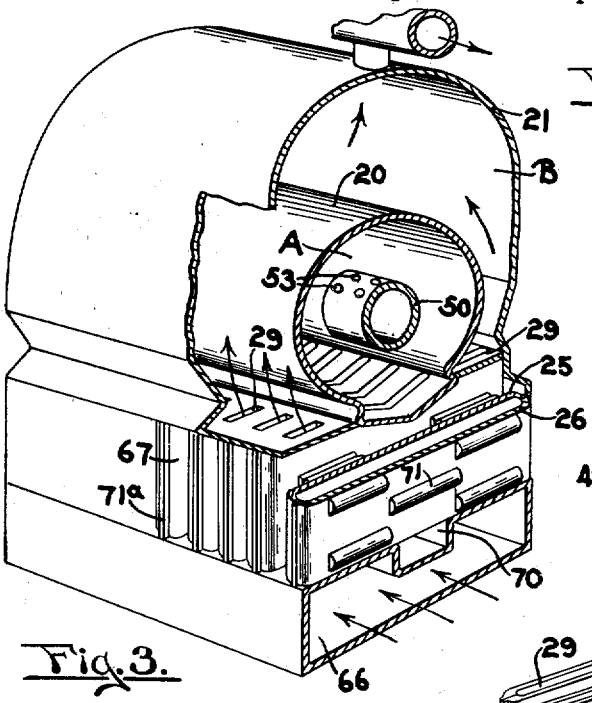
Figure 3 is a perspective view of the interior of the boiler construction.
Figure 7:
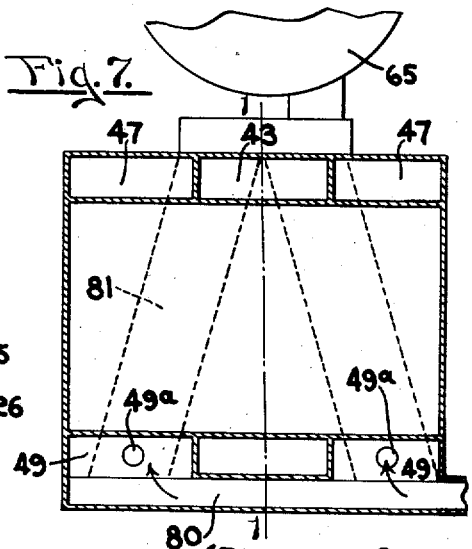
Figure 7 is a cross section through the recuperator.

Referring now to the construction illustrated in the drawings, the improved heat machine or furnace comprises a cylindrical shell 20 forming a combustion chamber A and an outer curved shell 21 forming a main boiler water space B surrounding the combustion chamber. 22 and 23 are end walls spaced from the ends of the combustion chamber A in order that the ends of the combustion chamber may also be surrounded by water. The inner and outer shells 20 and 21 are each supported on a base structure consisting of a plurality of tube plates which form a means for exchanging heat between the combustion gases and the liquid heating medium. The tube plates are preferably formed of sheet metal and arranged in a series in such a manner as to provide spaces for both the liquid and gaseous products.

Figure 4:
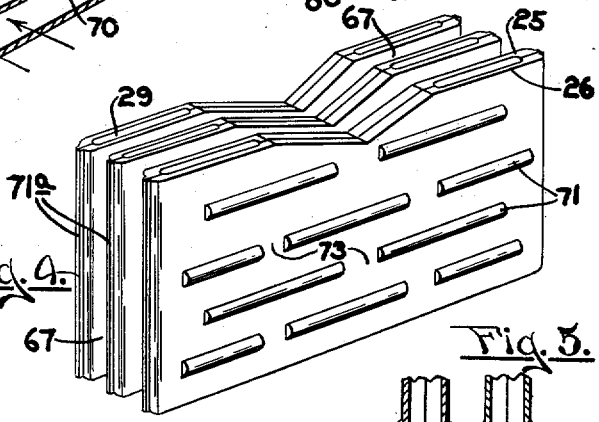
Figure 4 is a perspective view of the plate tubes.
Figure 5:
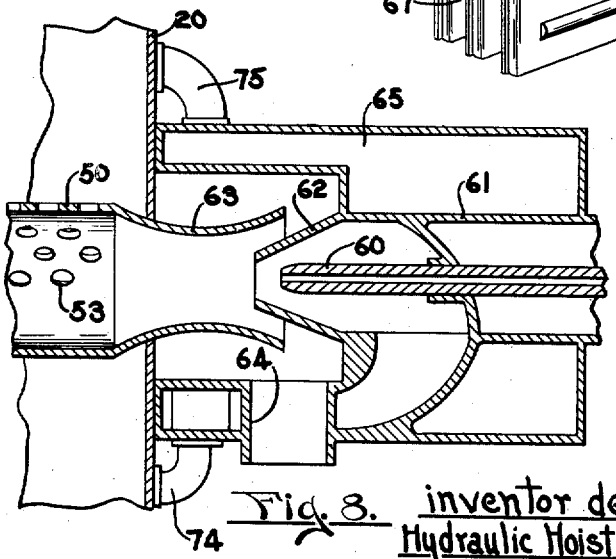
Figure 5 is a detailed view of the plate tube illustrating the baffle.
Figure 6:
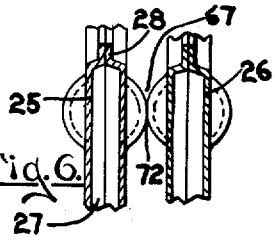
Figure 6 is another detail showing the joint in the plate tube.

As shown in Figure 4 the plate tubes are of generally rectangular shape, each being composed of two pressed metal sheets 25 and 26 spaced apart to form the intermediate water spaces 27. The plates which form the tubes or flues may all be of identical size and shape such as those shown which makes the structure more economical to manufacture. The sheets 25 and 26 have inwardly turned marginal flanges 28 which are secured together as indicated in Figure 6. At the top of each plate tube and at each side of the longitudinal center thereof are arranged openings 29 for affording communication from the water space B to the interior of the plate tube. At the bottom edges of each plate tube there are corresponding openings 36 which communicate with the lower water tank 66.

A plurality of plate tubes of the type illustrated in Figure 4 are arranged side by side below the combustion chamber A and the spaces between the adjacent plate tubes form vertical flue passageway 67. These passageways communicate through the openings 68 with the combustion chamber A and also communicate through the openings 69 with a flue conduit 70 extending longitudinally beneath all of said plate tubes. The flue passageways 67 are closed at the marginal portions by the spacing strips 71*a* which are suitably secured to the adjacent plate tubes to form fluid tight joints.

In order to form a circuitous passageway for the flue gases from the combustion chamber through the flue passageways to the flue conduit 70, horizontal baffles are arranged within the flue passageways. These baffles are preferably formed by the pressed out portions 71 of the sheets 25 and 26 and as illustrated in Figure 2 the pressed out portions are arranged in staggered relationship. The pressed out portions of adjacent plate tubes contact at 72 thereby compelling the flue gases to pass laterally and escape downwardly through the passageways 73 between the ends of the baffles. The flue conduit 70 leads to a recuperator, the purpose of which is to cause any heat remaining in the flue gases to be transferred to the air that is introduced into the combustion chamber.

The recuperator is of sheet metal construction similar to the heat exchange unit previously described and consists of a series of plate tubes forming alternate passageways for the flue gases and the incoming air respectively. The plate tubes are joined together to form the series of vertical interior passageways 48 for the incoming air and the intermediate passageways 41 for the flue gases. The interior passageways 48 communicate at their upper ends with the horizontal upper conduits 47 and at their lower ends with the horizontal lower conduits 49. The intermediate passageways 41 open into the upper flue conduit 43 and the lower flue conduit 40, which conduits are arranged centrally within the conduits 47 and 49 respectively. 80 is a conduit connected to the lower conduits 49 and serving to admit air under pressure to the recuperator. The flue gases are delivered to the flue conduit 40 from the flue conduit 70 which is preferably arranged in alignment therewith. In order to provide for increased length of travel of the incoming air and flue gases in the recuperator, the latter is preferably provided with a series of baffles. Thus as shown the baffle 42 extends through one of the flue passageways 41 and crosses the lower passageways 49 and 40. A second baffle 44 is longitudinally spaced from the first baffle and arranged to extend across the upper passageways 43 and 47, while terminating at a point leaving the lower passageways 49 and 40 unobstructed. A third baffle 35 is arranged in a similar manner to the first baffle 42.

The arrangement as above described causes the flue gases entering the lower flue conduit 40 to be directed upwardly through the passageways 41 by the baffle 42 and delivered to the upper flue passageway 43. The gases are then deflected downwardly by the second baffle 44 through the next series of vertical passageways 41 and arriving in the lower flue conduit 40 and are again deflected upwardly by the third baffle 35 and finally led downwardly into the conduit 40 from which they are delivered to the waste conduit 45. The incoming air travels in the opposite direction to the flue gases being delivered to the lower conduits 49 from the blower and deflected upwardly by the baffle 35 through the interior passageways 48 into the upper air passageways 47. The air is then deflected downwardly by the baffle 44, upwardly by the baffle 42 and downwardly by the end wall 46 of the recuperator and finally emerging through the outlet ports 49*a*. The wall 46 of the recuperator is preferably spaced slightly from the adjacent wall of the heat exchange unit and this intermediate space is utilized for carrying a Y-shaped conduit 81 from the outlet ports 49*a* to the combustion chamber of the burner.

Figure 8:
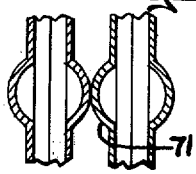
Figure 8 is a section through the fuel supply mechanism or burner.

Within the combustion chamber A is arranged a cylindrical baffle tube 50 closed at the inner end 51, the outer end 52 projecting beyond the end wall 22. The baffle tube has a series of apertures 53 extending through the upper portion thereof but the lower portion is imperforate. Fuel may be delivered to the combustion chamber in any suitable manner but preferably by providing a burner adapted to operate both on fuel oil and gas without requiring any changes in the burner. As illustrated in Figure 8 the burner comprises a central fuel nozzle 60 arranged within a surrounding pipe 61, the forward end 62 of which tapers adjacent the outlet of the fuel nozzle 60. 63 is a Venturi tube into which tube 62 discharges, this venturi being surrounded by a tubular portion 64 which in turn is surrounded by a water jacket 65. Water is circulated through this jacket entering by way of the inlet 74 and leaving by the outlet 75. The preheated air obtained from the Y-shaped conduit 81 of the recuperator is delivered under pressure to the air conduit 64 surrounding the venturi 63 from which it is delivered to the interior of the venturi 63 and supplies the necessary air for supporting complete combustion.

In the operation of the furnace the fuel (either oil or gas) is delivered through the fuel nozzle 60 in any suitable manner and the air for combustion is supplied through the conduit 64. The arrangement is such that the nebulized fuel from the fuel nozzle is entirely surrounded by the preheated air supply, thus resulting in very efficient combustion of the fuel. Combustion takes place in the cylindrical baffle tube 50, the function of which is to provide for a uniform distribution of the products of combustion to the furnace. The products escape through the apertures 53 and are thus directed upwardly into the cylindrical combustion chamber A and striking against the shell 20 are turned downwardly on opposite sides of the baffle tube 50. The combustion products while in the hottest state are thus directed against the shell 20 where the water is at its highest temperature, the result being that the water is efficiently converted into steam.

The flue gases after reaching the bottom of the combustion chamber are permitted to enter the vertical conduits 67 between the adjacent plate tubes and are finally led out into the flue conduit 70. In passing through the vertical conduits 67 the flue gases are compelled to take a circuitous route by reason of the arrangement of the baffles 71. The flue gases then pass through the recuperator by way of the conduit 40 through spaces 41 etc., finally escaping through the conduit 45 to the chimney or other waste conduit at practically room temperature.

It will be noted that the heat machine is so constructed that the hottest gases contact with the portion of the machine containing the water at the hottest temperature, and that these gases as they are cooled down are led progressively to portions of the apparatus containing water at lower temperatures. This arrangement facilitates the most rapid and complete heat transference possible to obtain because of the fact that the greatest differentials in temperatures are secured.

The burner is provided with a surrounding water jacket 65 as indicated above, the water jacket serving to absorb both direct and reflected heat thereby protecting the fuel nozzle. The water in the water jacket may be used in conjunction with an insulated boiler to provide a reservoir of hot water without in any way interfering with the capacity of the heat machine. The inlet and outlet conduits 74 and 75 may therefore be connected to a hot water boiler in the usual manner, or if it is not desired to supply a hot water heater from the furnace these conduits may be connected to the return lines between the radiators and the point where the return water would ordinarily be returned to the machine. In any event the heat from the burner is converted into useful work and is not wasted, thus increasing the efficiency of the machine.

One of the features of the machine as above described is the arrangement whereby the flame and hot gases are evenly distributed throughout the entire surface of the combustion chamber and flow with even flame density to all the plate tubes, thereby equalizing the load through the entire length of the heat generator. Another feature of the machine is the use of a recuperator for preheating air delivered to the combustion chamber. By means of this recuperator the temperature of the flue gases may be lowered to such a point that very little heat is lost in the waste gases.

An extremely desirable feature of the invention is the specific construction of the device which makes it possible to manufacture a boiler of sheet metal in a most efficient and economical manner. The passages of thin dimension formed by the stamped sheet metal plates arranged side by side in spaced apart relation, successive pairs of which are joined at their edges, forms a structure which will provide alternate gas and water flues or passages and the raised portions or embossments on the sheet metal plates engage each other to stiffen the structure and to provide supports to prevent its expansion or contraction from pressures within the flues. These raised portions also serve as baffles in the flues to cause the fluid passing therethrough to follow a circuitous path which aids materially in the heat transference of the device.

The invention claimed is:

1. A heat machine comprising a horizontal combustion chamber, a horizontally extending flue conduit below said combustion chamber, a series of parallel vertical flue passageways between said combustion chamber and flue passageway, a water chamber surrounding said combustion chamber, a water tank below said flue passageways and a series of water passageways connecting said water chamber and said water tank and arranged intermediate flue passageways in heat conducting relation thereto.

2. A heat machine comprising a horizontal cylindrical combustion chamber, a cylindrical baffle within said combustion chamber having ports in the upper surface thereof, means for introducing fuel and air within said baffle, a series of vertical plates forming alternate water and flue passageways, the latter being connected to said combustion chamber at the lower portion thereof and a conduit below said plates also connected to said flue passageways and water chambers surrounding said combustion chamber and said conduit and connected to said water passageways.

3. A heat machine comprising a series of vertical spaced plates constructed and arranged to form alternate flue passageways and water passageways, a water shell superposed above said plates, and communicating with said water passageways, a combustion chamber within said water shell communicating with said flue passageways, means for introducing fuel into said combustion chamber, and baffles in said flue passageways.

4. A heat machine comprising a horizontal combustion chamber, a cylindrical baffle within said combustion chamber having radial apertures in the upper half thereof, said combustion chamber having a series of outlets extending lengthwise thereof at the bottom, a water chamber surrounding said combustion chamber, a series of laterally spaced vertical plates having their edges secured together to form alternate gas and liquid chambers, the liquid chamber opening into said water chamber and said gas chamber opening into said combustion chamber at said outlets and passageways below said plates communicating respectively with said gas and liquid chambers.

5. A heat machine comprising an outer shell, an inner shell arranged within said outer shell and forming a combustion chamber, a flue passageway spaced from and substantially parallel to said inner shell, a series of plates intermediate said inner shell and flue passageway and extending transversely thereto forming a series of thin passageways, said plates being so connected to said inner and outer shells as to place adjacent passageways between the plates in communication with the inner and outer shells respectively, and a water passageway surrounding said flue passageway and so connected to said plates that the passageways communicating with the outer shell are in communication also with said water passageway and the passageways communicating with the inner shell also communicate with said flue passageway.

6. A heat machine comprising a tubular combustion chamber, a water chamber surrounding said combustion chamber, a flue passageway spaced from and substantially parallel to said combustion chamber, a water passageway surrounding said flue passageway and a series of spaced plates connecting said combustion chamber and flue passageway and arranged transversely thereto, said plates being so formed as to constitute alternate flue and water passages, the flue passages connecting said combustion chamber and said flue passageway and said water passages connecting said water chamber and said water passageway, and means within the flue passages between said plates for compelling the flue gases to traverse a tortuous path from the combustion chamber to said flue passageway.

7. A heat machine comprising a tubular combustion chamber, a water chamber surrounding said combustion chamber, a flue passageway spaced from said combustion chamber and parallel thereto, a water passageway partly surrounding said flue passageway and a series of conduits arranged transversely to said combustion chamber and said flue passageway, the alternate conduits being adapted for flue and water passages respectively, said flue passages being connected to said combustion chamber and said flue passageway and said water passages being connected to said water chamber and said water passageway, said flue passages being defined by the walls of adjacent water passages.

8. A heat machine comprising, a horizontal combustion chamber, a water chamber surrounding the combustion chamber, said combustion chamber having a series of outlets at the bottom, a series of pairs of vertical plates, each pair of plates having their edges secured together to form alternate gas and liquid chambers between adjacent plates of the pairs of plates and between the plates of each pair respectively, said plates being disposed transverse of the length of combustion chamber, the liquid chambers communicating with the water chamber and the gas chambers communicating with said combustion chamber at said outlets, and a lower flue passageway below said plates communicating with said gas chambers.

9. A heat machine comprising a horizontal combustion chamber, a water chamber surrounding said combustion chamber, a series of pairs of parallel plates located transversely of and below the combustion and water chambers providing water passages between each pair of plates and passages for combustion gases between the plates of adjacent pairs of plates, said combustion chamber being open at its bottom and communicating with said gas passages and said water chamber having openings at the bottom thereof communicating with the water passages, a water tank below and extending under all of said plates having communication with said water passages and having a longitudinal flue formed at its upper side lengthwise thereof in communication with said gas passages.

10. In a structure of the class described, an elongated horizontal combustion chamber formed into substantially cylindrical shape and open lengthwise at its under side and formed with horizontal outwardly extending wings, a metal shell having substantially vertical sides and a curved top around the combustion chamber the edges of said wings engaging with and connected to the sides of the shell thereby forming a water chamber around the combustion chamber, a horizontal metal tank located a distance below the combustion chamber and formed at its upper side with a longitudinal flue passage therein, and a plurality of metal plates disposed transversely between the upper side of said tank and the lower side of said combustion chamber and the wings thereof and secured thereto, said plates being arranged in pairs each pair having edges turned toward each other to space the plates apart and said edges being permanently secured together to form water tight passages between each pair of plates, and the adjacent plates of contiguous pairs of plates being spaced from each other forming gas passages, there being openings through said wings communicating with the water passages between pairs of plates and similar openings in the upper side of said tank communicating with said water passages, and there being direct communication between the lower open side of the combustion chamber with said gas passages between adjacent pairs of plates and also direct communication between said flue and said gas passages.

11. In a construction containing the elements in combination defined in claim 10, each pair of plates having horizontal spaced apart embossings pressed outwardly therefrom at a plurality of vertically spaced planes in the height of the plates, the embossings on the plates of a pair of plates bearing against like embossings on the plates of the next adjacent pairs of plates, thereby providing baffles to force a circuitous passage of the products of combustion from the combustion chamber to said flue.

12. A heat machine comprising, a combustion chamber, a water chamber partially surrounding said combustion chamber, a flue passageway spaced from said combustion chamber, a water passageway partially surrounding said flue passageway and a series of spaced plates connecting said combustion chamber and flue passageway, said plates being so formed as to constitute alternate flue and water passageways, the flue passageways connecting said combustion chamber and said flue passageway and the water passageways connecting said water chamber and said water passageway and baffles within said passageways arranged to cause the fluid to pass therethrough in a tortuous path.

13. A heat machine comprising, a combustion chamber, a water chamber partially surrounding said combustion chamber, a flue passageway spaced from said combustion chamber, means for circulating water partially surrounding said flue passageway and a series of conduits, the alternate conduits being adapted for flue and water passageways respectively, said flue conduits being connected to said combustion chamber and to said flue passageway and said water conduits being connected to said water chamber and said water circulating means, said flue conduits being defined by the walls of adjacent water passages.

14. In a heat machine, a series of substantially parallel plates fastened together to form fluid spaces, one set of alternate spaces having openings connecting the same to a combustion chamber and to a flue and each of the other set of spaces having four openings therein, two of these openings being near opposite edges of the plates and also being vertically spaced from the other two for the purpose described.

15. A heat machine comprising, a combustion chamber, a flue conduit spaced therefrom, a series of passageways leading from the combustion chamber downwardly to the flue conduit, a water chamber partially surrounding the combustion chamber and also the said series of passageways and common door means for obtaining access to the series of passageways for the purpose described.

WOOD HYDRAULIC HOIST
& BODY COMPANY,
*Assignee of Horace M. Jerome, Deceased.*
GARFIELD A. WOOD,
*President.*